3,070,507
NOVEL CORTICOIDS FROM Δ¹⁶-20-KETO-
ALKENYL ADDUCTS
Donald P. Cameron, New London, Conn., assignor to
Chas. Pfizer & Co., Inc., New York, N.Y., a corporation of Delaware
No Drawing. Filed Aug. 22, 1960, Ser. No. 50,869
5 Claims. (Cl. 167—77)

This invention relates to new and useful corticoid compounds, as well as to the processes for their production. More particularly, it is concerned with novel corticoids that are derived from lower alkyl alkenyl adducts of various $\Delta^{16}$-20-keto-steroids. There is also included within the purview of this invention various pharmaceutical compositions which have at least one of the herein described compounds as their essential active ingredient. This present application is a continuation-in-part of my currently copending U.S. patent application, Serial No. 19,995, filed April 5, 1960.

The compounds which come within the scope of the present invention are selected from the class of steroids corresponding to the following general structural formulae:

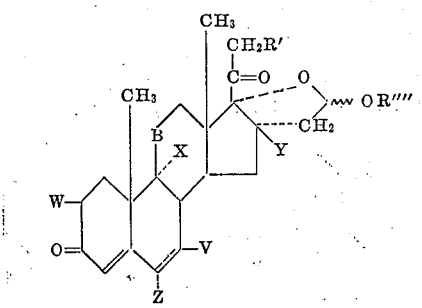

and

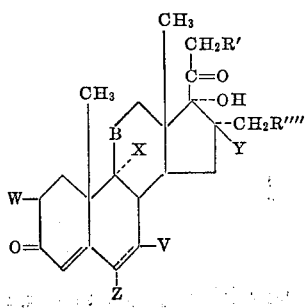

and

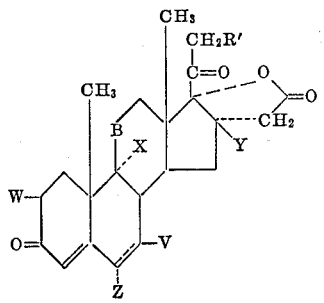

and

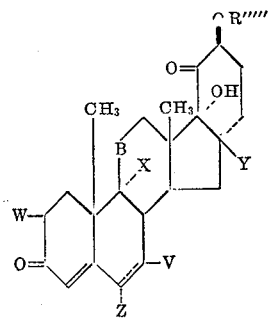

and the $\Delta^{1(2)}$-derivatives of all these compounds, wherein B is a member of the group consisting of hydroxymethylene and carbonyl, W is a member of the group consisting of hydrogen and methyl, X is a member of the group consisting of hydrogen, fluorine and chlorine, Y is a member of the group consisting of hydrogen and methyl, Z is a member of the group consisting of hydrogen, hydroxyl, acetoxyl, fluorine and methyl, V is a member of the group consisting of hydrogen and S-acetylmercapto, R' is a member of the group consisting of hydroxyl and acyloxyl wherein the acyl moiety is derived from a hydrocarbon carboxylic acid containing up to ten carbon atoms, R''' is lower alkyl, R'''' is a member of the group consisting of methyl, hydroxymethyl, carboxaldehyde, carboxyl and carbalkoxyl, and R''''' is a member of the group consisting of hydrogen and acetyl; and the $\Delta^{9(11)}$- and $9\beta,11\beta$-epoxide derivatives of those compounds wherein X is hydrogen and B is hydroxymethylene. Among the many specific examples of compound types which are included within the present invention are such compounds as $16\alpha$-ethyl-$\Delta^{1,4}$-pregnadiene-$11\beta,17\alpha,21$-triol-3,20-dione 21-acetate, $16\alpha$-formylmethyl-$\Delta^{1,4}$-pregnadiene-$11\beta,17\alpha,21$-triol-3,20-dione 21-acetate, $16\alpha$-formylmethyl-$\Delta^{1,4}$-pregnadiene-$17\alpha,21$-diol-3,11,20-trione 21-acetate, the $16\alpha$-(lower carbalkoxymethyl)-$\Delta^{1,4}$-pregnadiene-$11\beta,17\alpha,21$-triol - 3,20-dione 21-acetates, and the like.

In accordance with the present invention, the aforementioned subject compounds possess valuable physiological properties which render them useful as synthetic medicinals. More particularly, they possess the characteristic properties of glucocorticoids and are especially valuable in view of the anti-inflammatory activity which they exhibit. Hence, they are of value in treating allergies and other inflammatory conditions of the skin, as well as for alleviating the painful effects caused by rheumatoid arthritis and like ailments. The instant compounds are all crystalline solids and are for the most part insoluble in water, but readily soluble in alcohol and other common organic solvents.

In accordance with all the various methods employed herein for preparing compounds of the present invention, the aforementioned lower alkyl alkenyl adducts are subjected to several of the standard reactions which a pyran ring will undergo whereby cleavage of the ring is achieved and the desired products are obtained therefrom. For instance, the pyran ring of the appropriate heterocyclic addition product, i.e., adduct, can be cleaved by acid hydrolysis to afford the corresponding open chain $16\alpha$-formlymethyl compound, which on treatment with silver oxide yields the closely related $16\alpha$-carboxymethyl-steroid. Treatment of the latter intermediate with a dehydrating agent such as benzenesulfonic acid or p-toluenesulfonic acid converts the $\Delta^{17(20)}$-20-enol form of this compound to the corresponding 17,20-enol lactone which also happens to be an anti-aldosterone type compound. Subsequent treatment of the latter compound with either perbenzoic acid or osmium tetroxide followed by acid hydrolysis affords the desired corticosteroid (type IV)

where R'''' is COOH. Conversion of the latter type compound to an ester or an alcohol is then readily accomplished by conventional means, e.g., the acid can be esterified in the usual manner and the resultant ester subsequently reduced to the corresponding alcohol (where R''''  is CH₂OH) by any number of standard methods, such as by lithium aluminum hydride reduction or by treatment of the ester with sodium and alcohol in a Bouveault-Blanc type reaction. This entire series of reactions as outlined above, excluding the ester and alcohol formation steps, is illustrated below by means of the following set of equations wherein only the pertinent portions of the steroid molecule are shown and R' has the same meaning as hereinbefore stated, while R'' is a lower alkyl group preferably having from one to three carbons:

Alternatively, a different and somewhat more versatile route can be employed in order to achieve the same result in addition to yielding compounds of types III and V. This second series of reactions is illustrated below by the following set of equations:

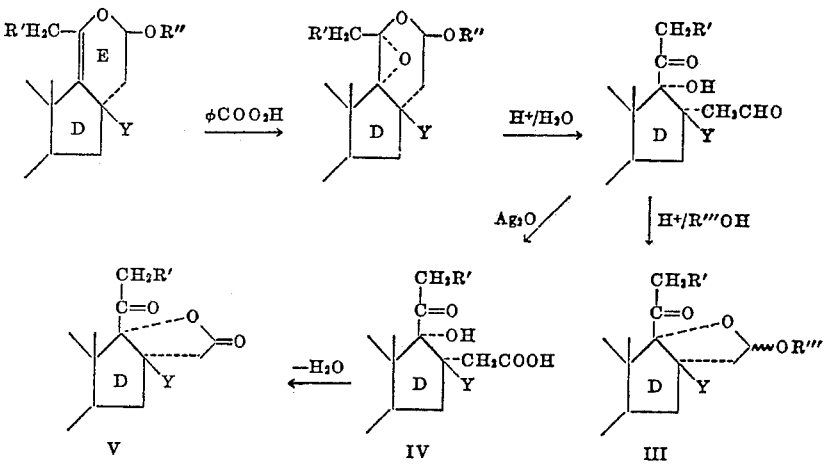

The above type series of reactions have already been individually encountered in the first set of equations with the exception of the alcoholysis step used to produce compounds of type III and inasmuch as the latter step is a conventional one, it is certainly well-known to those skilled in the art. Finally, the open chain 16α-formylmethyl compound prepared in the first series of reactions is the starting point for the synthesis of compounds of type VI as is shown by the following series of equations:

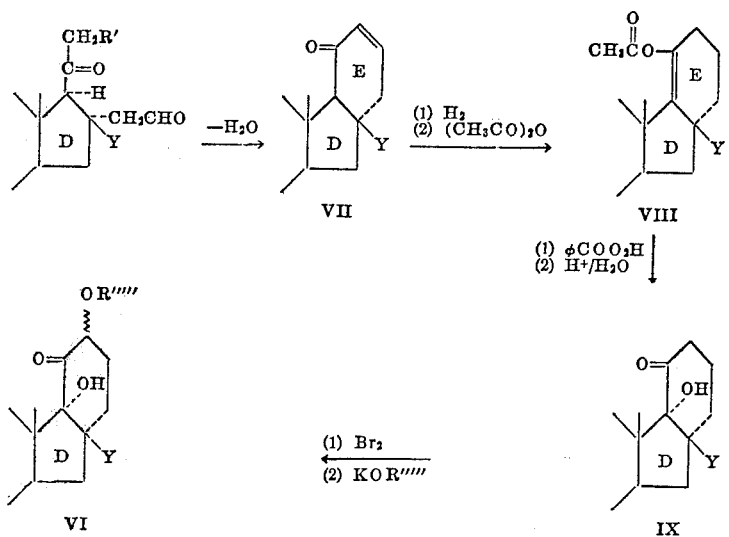

The starting materials employed in all the series of re-

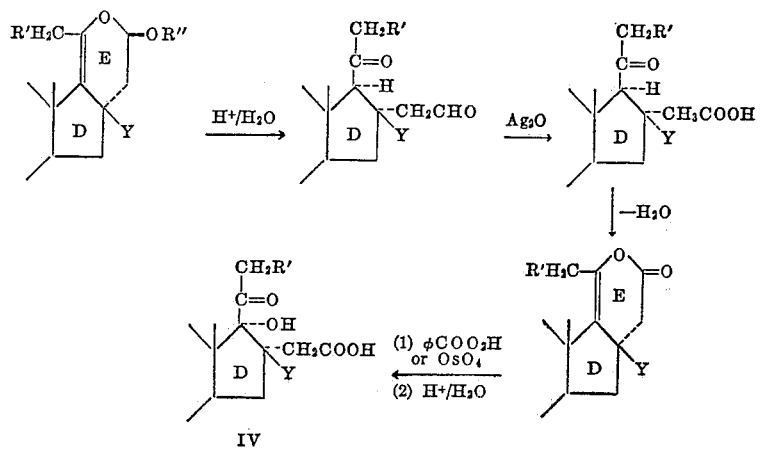

action processes outlined above, i.e., the heterocyclic addition products or Diels-Alder type adducts, are obtained by condensing the appropriate lower alkyl alkenyl ether and a $\Delta^{16}$-20-ketosteroid dieneophile in accordance with the procedure described in the aforementioned copending patent application of the present inventor.

As previously indicated, the compounds of the present invention are readily adapted to therapeutic use as glucocorticoids and/or especially as anti-inflammatory agents. In general, they are administered at dosage levels which are approximately of the same order of magnitude as those employed in the case of other known reagents for just such purposes like hydrocortisone, for example. Moreover, they accomplish their valuable therapeutic effects without causing any harmful or deleterious physiological side reactions to occur, e.g., there is little or no sodium retention. These aforementioned biologically active compounds may either be administered alone or in combination with pharmaceutically acceptable carriers and such administration can be carried out via the oral or parenteral routes. For purposes of oral administration, the compounds may be administered in the form of tablets or capsules containing excipients such as starch or milk sugar. Alternatively, it is also possible to employ aqueous suspensions and elixirs which can be suitably sweetened or flavored as desired. For purposes of parenteral administration, intramuscular and subcutaneous dosage forms, such as injectable solutions, may be prepared in accordance with standard pharmaceutical practice. Additionally, it is also possible to administer the corticosteroid compounds topically when treating inflammatory conditions of the skin.

This invention is further illustrated by the following examples, which are not to be construed as imposing any limitations on the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

*Example I*

To a suspension of the ethyl vinyl ether adduct of $\Delta^{1,16}$-corticosterone 21-acetate in 100 ml. of methanol, there is added 5 ml. of 10% sulfuric acid and the resulting solution is refluxed for one hour. At the end of this period, the reaction solution is concentrated under reduced pressure to about one-third of its original volume, and the residual liquid twice extracted with an equal volume of ethyl acetate. The combined extracts so obtained are washed once with saturated sodium bicarbonate solution and twice with saturated saline, and subsequently dried over anhydrous sodium sulfate. After removal of the drying agent by means of filtration and the solvent by means of evaporation under reduced pressure, there is obtained a residual solid material which after crystallization from acetone-petroleum ether proved to be 16α-formylmethyl-$\Delta^{1,4}$-pregnadiene-11β,21-diol-3,20-dione 21-acetate.

*Example II*

A mixture consisting of 1.0 g. of 16α-formylmethyl-$\Delta^{1,4}$-pregnadiene-11β,21-diol-3,20-diol-3,20-dione and 5.0 g. of silver oxide in 50 ml. of ethanol is stirred at room temperatures for two hours. At the end of this time, a characteristic silver mirror had appeared on the inside of the reaction flask, indicating completion of the reaction. After removal of the silver by means of filtration and the ethanol solvent by means of evaporation under reduced pressure, there is obtained as the residual material an almost quantitative yield of 16α-carboxymethyl-$\Delta^{1,4}$-pregnadiene-11β,21-diol-3,20-dione 21-acetate.

*Example III*

A solution of 5.0 g. of 16α-carboxymethyl-$\Delta^{1,4}$-pregnadiene-11β,21-diol-3,20-dione 21-acetate in 150 ml. of glacial acetic acid containing 0.2 g. of p-toluenesulfonic acid is stirred at approximately 50° C. for about four hours. The resulting acidic reaction solution is then diluted with three times its volume of water, and the precipitated product so obtained is collected on a filter funnel and air dried to constant weight. It proved to be the 17,20-enol lactone of the aforesaid starting material of this example.

*Example IV*

A solution of 700 mg. of osmic acid in 20 ml. of benzene is added to a solution consisting of 1.0 g. of the 17,20-enol lactone prepared in the previous example dissolved in 10 ml. of benzene and 2 ml. of pyridine, and the resulting mixture is stirred at room temperature for about two hours and then filtered. The osmate ester is then decomposed by saturating the resulting filtrate with hydrogen sulfide and allowing the so-saturated solution to stand at room temperature for one hour. At the end of this time, the black inorganic precipitate is filtered, washed with chloroform and then with hot tetrahydrofuran. Concentration of the combined filtrate and washings under reduced pressure affords the corresponding 17α,20-diol, which is then subsequently subjected to the acid hydrolysis procedure of Example I to yield 16α-carboxymethyl-$\Delta^{1,4}$-pregnadiene - 11β,17α,21 - triol - 3,20-dione 21-acetate.

Treatment of the latter compound with excess diazomethane in diethyl ether affords the corresponding 16-methyl ester, which is identical with that obtained by the classical method wherein the aforesaid acid is refluxed in an excess of methanol containing a catalytic amount of concentrated sulfuric acid.

In like manner, the use of other lower alkanols, such as ethanol, isopropanol n-butanol, and so forth, in place of methanol in the aforesaid reaction step, affords the corresponding 16α(lower carbalkoxymethyl)-$\Delta^{1,4}$-pregnadiene-11β,17α,21-triol-3,20-dione 21-acetate in each instance.

*Example V*

Other products which fall within the purview of the present invention and which can be prepared in accordance with the overall reaction procedure described in Examples I–IV form a large but yet determinable number of compounds. The following list of adduct starting materials in given below in order to avoid unnecessary repetition of experimental detail. Some of these adducts are specifically reported in copending U.S. patent application Serial No. 19,995, filed April 5, 1960, while others can be prepared in accordance with the procedures described therein. In each and every case, the corresponding product obtained is a 16α-carboxymethyl corticosteroid.

Ethyl vinyl ether adduct of $\Delta^{16}$-corticosterone 21-acetate

Ethyl vinyl ether adduct of 2-methyl-$\Delta^{1,16}$-corticosterone 21-acetate

Ethyl vinyl ether adduct of 9α-fluoro-$\Delta^{1,16}$-corticosterone 21-acetate

Ethyl vinyl ether adduct of 6α-fluoro-$\Delta^{16}$-corticosterone 21-acetate

Ethyl vinyl ether adduct of 21-methyl-$\Delta^{16}$-corticosterone 21-acetate

Ethyl vinyl ether adduct of 6α-fluoro-16-methyl-$\Delta^{16}$-corticosterone 21-acetate Ethyl vinyl ether adduct of 6-methyl-$\Delta^{1,16}$-corticosterone 21-acetate Ethyl vinyl ether adduct of $\Delta^{9(11),16}$-corticosterone 21-acetate Ethyl vinyl ether adduct of 9β,11β-oxide-$\Delta^{16}$-corticosterone 21-acetate Ethyl vinyl ether adduct of 7-(S-acetylmercapto)-$\Delta^{16}$-corticosterone 21-acetate Ethyl vinyl ether adduct of 6β-hydroxy-$\Delta^{16}$-corticosterone 21-acetate n-Propyl vinyl ether adduct of $\Delta^{1,16}$-corticosterone 21-acetate Methyl vinyl ether adduct of $\Delta^{1,16}$-corticosterone 21-acetate Ethyl isopropenyl ether adduct of $\Delta^{16}$-corticosterone 21-acetate Isopropyl vinyl ether adduct of 9α-fluoro-$\Delta^{16}$-corticosterone 21-acetate.

Methyl isopropenyl ether adduct of $\Delta^{1,16}$-corticosterone 21-acetate

Ethyl vinyl ether adduct of $\Delta^{1,16}$-11-dehydrocorticosterone 21-acetate.

*Example VI*

An ethereal solution of perbenzoic acid containing 1 g. of active oxygen is added to 30 g. of the ethyl vinyl adduct of $\Delta^{1,16}$-corticosterone 21-acetate dissolved in a minimum amount of ethyl acetate. After stirring the reaction mixture at room temperature for about five days, the ethereal solution is washed with dilute alkali, dried over anhydrous sodium sulfate and evaporated under reduced pressure to remove the volatile solvent. The residual material is then purified by means of recrystallization from acetone to afford the 9β,11β-epoxide derivative of the aforesaid starting material in pure crystalline form.

*Example VII*

The reaction product obtained in the above example is then subjected to the procedure described in Example I to yield 16α-formylmethyl-$\Delta^{1,4}$-pregnadiene-11β,17α,21-triol-3,20-dione 21-acetate.

Conversion of the latter material to the corresponding 16α-carboxymethyl compound is then accomplished by treating said product in accordance with the procedure described in Example II to yield 16α-carboxymethyl-$\Delta^{1,4}$-pregnadiene-11β,17α,21-triol-3,20-dione 21-acetate.

When the same carboxymethyl derivative is subjected to the dehydration procedure described in Example III, the corresponding product obtained is the δ-lactone of the aforesaid acid, i.e., the 16,17-lactone of 16α-carboxymethyl-$\Delta^{1,4}$-pregnadiene-11β,17α,21-triol-3,20-dione 21-acetate.

*Example VIII*

To 100 ml. of absolute methanol containing 5 g. of anhydrous sodium sulfate in suspension, there is added 1 g. of 16α-formylmethyl-$\Delta^{1,4}$-pregnadiene-11β,17α,21-triol-3,20-dione 21-acetate and 0.1 g. of chloroacetic acid. The mixture is then stirred at room temperature for about twenty hours in a flask which is protected against atmospheric moisture. The reaction mixture so obtained is then filtered in order to remove the suspended solids, and the resulting filtrate is concentrated under reduced pressure to afford a colorless crystalline material that is subsequently washed with water and then air dried. After recrystallization of the latter material twice from methanol, there is obtained a pure yield of the corresponding deoxy hemi-methyl acetal of the 16α-formylmethyl compound obtained in Example VII.

When other lower alkanols are employed in the above reaction procedure in place of methanol, such as ethanol, isopropanol, n-butanol, and so forth, the corresponding deoxy hemi-alkylacetal is the product obtained.

*Example IX*

16α-formylmethyl - $\Delta^{1,4}$ - pregnadiene-11β,21-diol-3,20-dione (2.0 g.) is added to 60 ml. of glacial acetic acid containing 0.1 g. of p-toluenesulfonic acid and the resulting reaction mixture is stirred at 50° C. for a period of approximately five hours. The product is then isolated in exactly the same manner as that described in Example III and it proved to be the corresponding five-membered ring compound of type VII.

*Example X*

Catalytic hydrogenation of the compound prepared in Example IX is achieved by suspending 10 g. of the latter compound in 100 ml. of methanol to which 0.5 g. of a 5% palladium-on-charcoal catalyst is added. The mixture is then placed in a conventional hydrogenation apparatus and subjected to a pressure of 50 p.s.i. of hydrogen while being constantly agitated. After the initial drop in pressure due to the absorption of the gas by the catalyst and the solvent, there is observed a steady drop in pressure due to the hydrogenation of the E ring double bond. After approximately one mole of hydrogen had been absorbed, no further hydrogen up-take could be observed. The catalyst is then removed by means of filtration and the resulting filtrate is concentrated under reduced pressure to afford the corresponding crystalline compound of type VIII wherein there is a hydroxyl group at the 20-position of the molecule.

O-acetylation of the aforementioned hydroxyl group of the compound obtained in the manner just described is then accomplished via the use of a mixture of acetic anhydride and pyridine. The acetylated reaction product so prepared can then be purified, if so desired, by chromatographic means until an infrared analysis of same reveals the absence of any free hydroxyl group.

*Example XI*

The acetylated reaction product obtained in the previous example is then successively subjected to the peroxidation procedure of Example VI and then to the acid hydrolysis procedure of Example I to afford the corresponding compound of type IX in good yield.

*Example XII*

Five grams of the product obtained in Example XI is mixed with 30 g. of bromine in 50 ml. of glacial acid to which about 0.3 g. of phosphorous trichloride is added. The mixture is then heated under reflux to about 60–70° C. until the initial reaction slackens, at which point the temperature is gradually raised to 100° C. When all the bromine has reacted, the product is recovered from the reaction mixture by cooling said mixture to room temperature and then removing the resulting crystalline precipitate by means of filtration.

Treatment of the α-bromo compound so prepared with an equivalent amount of potassium acetate, then affords the corresponding acetoxy derivative of compound type VI.

*Example XIII*

The procedure described in Examples VI–XII is repeated except that the starting material used in Example VI is replaced by any one of the closely related compounds listed in Example V. In this manner, the corresponding products obtained by this same procedure differ from those previously reported only in the nature of their substituents and degree of unsaturation on the A, B, C and D ring portions of the molecule.

*Example XIV*

The 21-acetates reported as products in all the foregoing examples are converted to the corresponding free 21-alcohols by means of alkaline hydrolysis using conventional procedures. Thus, 16α-carboxymethyl-$\Delta^{1,4}$-pregnadiene-11β,17α,21 - triol - 3,20-dione 21-acetate is converted in this manner to the corresponding alkali metal salt of 16α-carboxymethyl - $\Delta^{1,4}$ - pregnadiene-11β,17α,21-triol-3,20-dione.

*Example XV*

A variety of 21-esters of the free alcohols prepared as described in Example XIV other than the previously reported 21-acetates are each prepared in accordance with conventional esterification procedures. The compounds prepared in this manner includes the 21-formates, 21-propionates, n-butyrates, hexanoates, 2-ethylhexanoates, octanoates, cyclopentylpropionates, decanoates, hemisuccinates, benzoates, etc. In this connection, it is to be noted that the half acid esters of dicarboxylic acids such as the hemisuccinates have a further advantage in that alkali metal and alkaline-earth metal salts can be prepared from them by merely treating them with molar proportions of a base such as sodium or potassium bicarbonate or barium hydroxide. These salts are water soluble, an advantage not possessed by the free alcohols themselves or by ordinary esters thereof.

What is claimed is:

1. A compound selected from the group consisting of steroids corresponding to the general structural formulae:

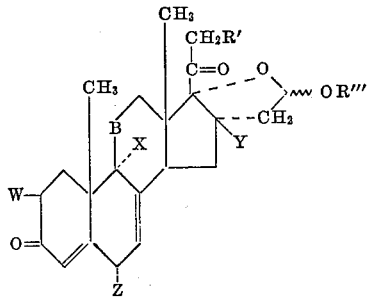

and

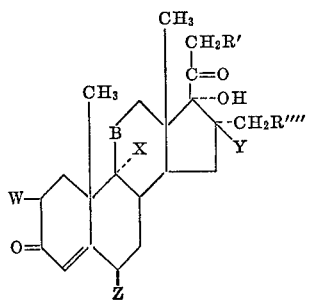

and

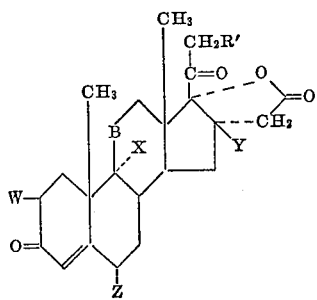

and

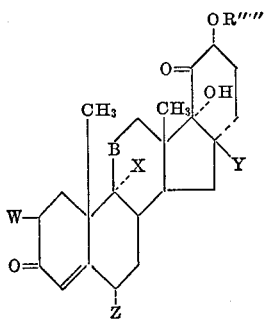

and the $\Delta^{1(2)}$-derivatives of all these compounds, wherein B is a member of the group consisting of hydroxymethylene and carbonyl, W is a member of the group consisting of hydrogen and methyl, X is a member of the group consisting of hydrogen, fluorine and chlorine, Y is a member of the group consisting of hydrogen and methyl, Z is a member of the group consisting of hydrogen, hydroxyl, acetoxyl, fluorine and methyl, R' is a member of the group consisting of hydroxyl and acyloxyl wherein the acyl moiety is derived from a hydrocarbon carboxylic acid containing up to ten carbon atoms, R''' is lower alkyl, R'''' is a member of the group consisting of hydroxymethyl, carboxaldehyde, carboxyl and carbalkoxyl, and R''''' is a member of the group consisting of hydrogen and acetyl; and the $\Delta^{9(11)}$- and $9\beta,11\beta$-epoxide derivatives of those compounds wherein X is hydrogen and B is a hydroxymethylene.

2. Pharmaceutical compositions comprising a compound as claimed in claim 1 together with a pharmaceutically acceptable carrier.

3. 16α - formylmethyl - $\Delta^{1,4}$ - pregnadiene-11β,17α,21-triol-3,20-dione-21-acetate.

4. 16α - formylmethyl - $\Delta^{1,4}$ - pregnadiene - 17α,21-diol-3,11,20-trione 21-acetate.

5. The 16α-(lower carbalkoxymethyl)-$\Delta^{1,4}$-pregnadiene-11β,17α,21-triol-3,20-dione 21-acetates.

References Cited in the file of this patent

Boland: "California Medicine," vol. 88, No. 6, June 1958, page 418.